United States Patent

[11] 3,563,579

| [72] | Inventor | Kenneth Reiner<br>7875 Telegraph Road, Pico Rivera, Calif. 90660 |
|---|---|---|
| [21] | Appl. No. | 741,597 |
| [22] | Filed | July 1, 1968 |
| [45] | Patented | Feb. 16, 1971 |

[54] STRUCTURAL JOINTS
11 Claims, 11 Drawing Figs.

[52] U.S. Cl. .................................................... 287/119, 248/188.7
[51] Int. Cl. .................................................... F16b 12/40
[50] Field of Search ........................................... 248/188.7, 165, 48, 188.1; 211/177, 182; 287/58CT, 119, 124; 108/150, 156; 138/111, 116; 285/150

[56] References Cited
UNITED STATES PATENTS

| 948,537 | 2/1910 | Wilson | 248/165 |
|---|---|---|---|
| 955,349 | 4/1910 | O'Brien | 248/165X |
| 1,335,726 | 4/1920 | DeLong | 248/165 |
| 2,594,605 | 4/1952 | Zoppelt | 287/58CT |
| 2,800,737 | 7/1957 | Crossan | 287/58CT |
| 3,057,659 | 10/1962 | Bargen et al. | 108/157 |
| 3,244,128 | 4/1966 | Rogalski et al. | 248/165X |
| 1,141,067 | 5/1915 | Lloyd | 138/111 |
| 3,336,056 | 8/1967 | Cassel et al. | 138/116UX |
| 3,437,362 | 4/1969 | Offenbroich | 287/124 |
| 3,476,869 | 11/1969 | Hawkins | 285/150 |

FOREIGN PATENTS

| 363,125 | 12/1931 | Great Britain | 248/165 |
|---|---|---|---|
| 130,167 | 5/1902 | Germany | 138/111 |

*Primary Examiner*—David J. Williamowsky
*Assistant Examiner*—Andrew V. Kundrat
*Attorney*—T. L. Stam ABSTRACT: This invention relates to structural joints and more specifically to joints of a type wherein a plurality of elements have the terminal ends thereof attached to the tubular end portion of another element, one example being the attachment of three supporting legs to an upright post or standard. The structures of the invention are characterized in that the ends of the leg elements are of reduced cross section and inserted into the open tubular ends of post elements to provide economical, easily assembled and disassembled, or physically more attractive constructions. Various alternative means have been described for positioning the parts and for inhibiting relative movement thereof.

PATENTED FEB 16 1971 3,563,579
SHEET 1 OF 2
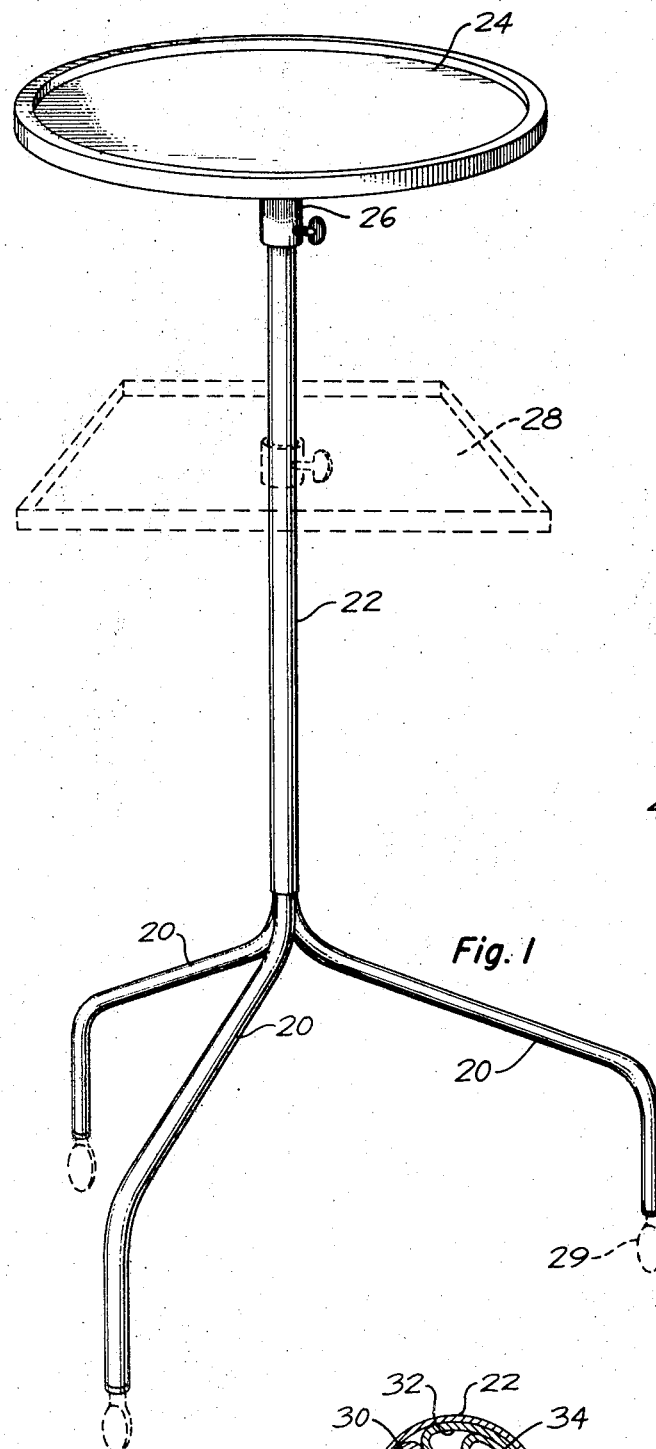
Fig. 1
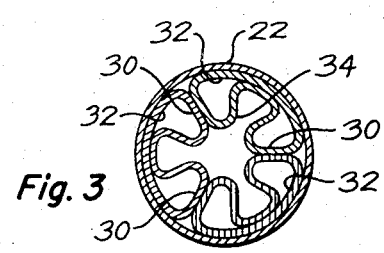
Fig. 3
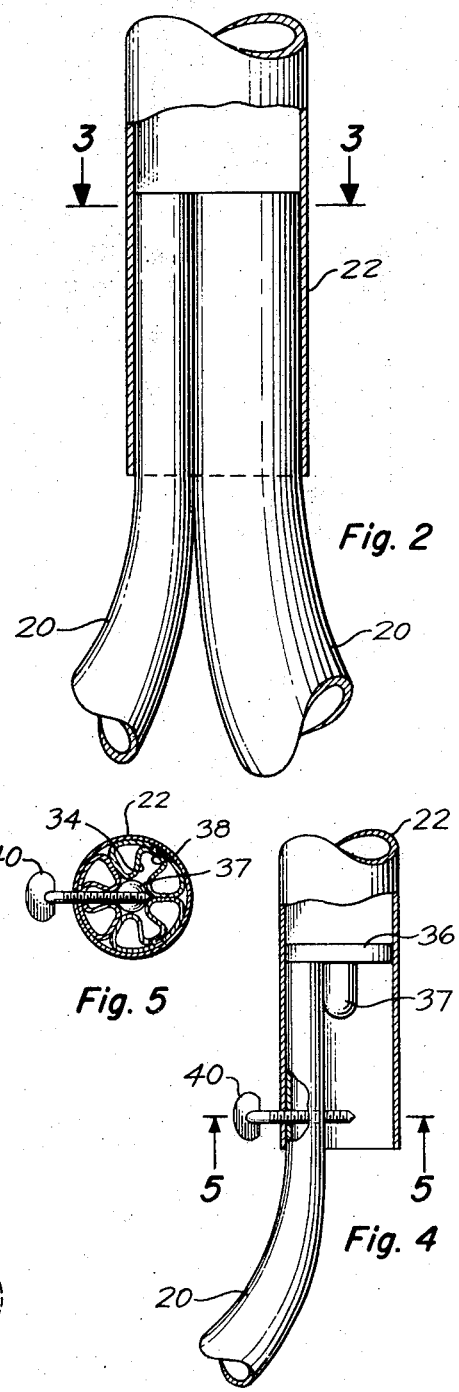
Fig. 2
Fig. 5
Fig. 4
KENNETH REINER
INVENTOR.
BY T. L. Stam
ATTORNEY.

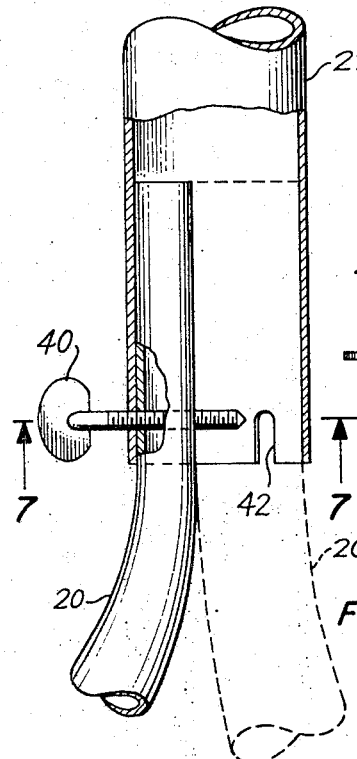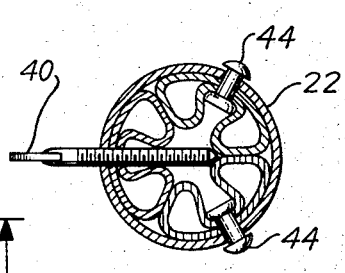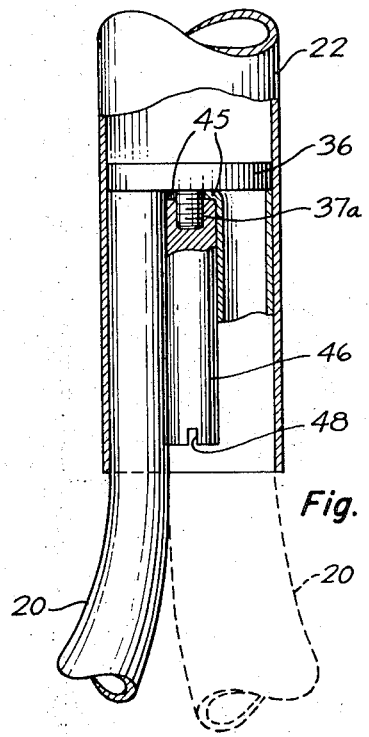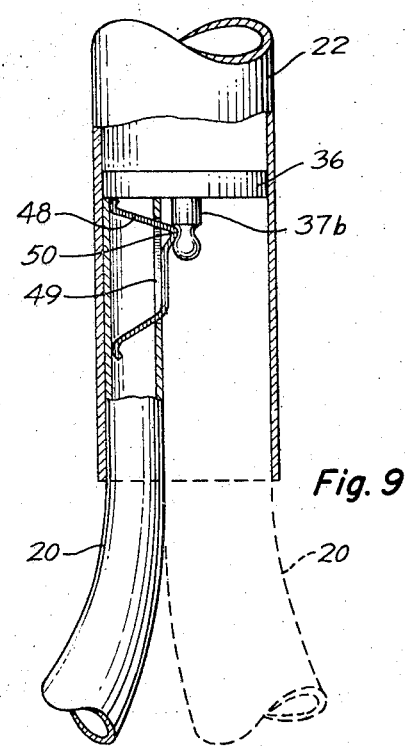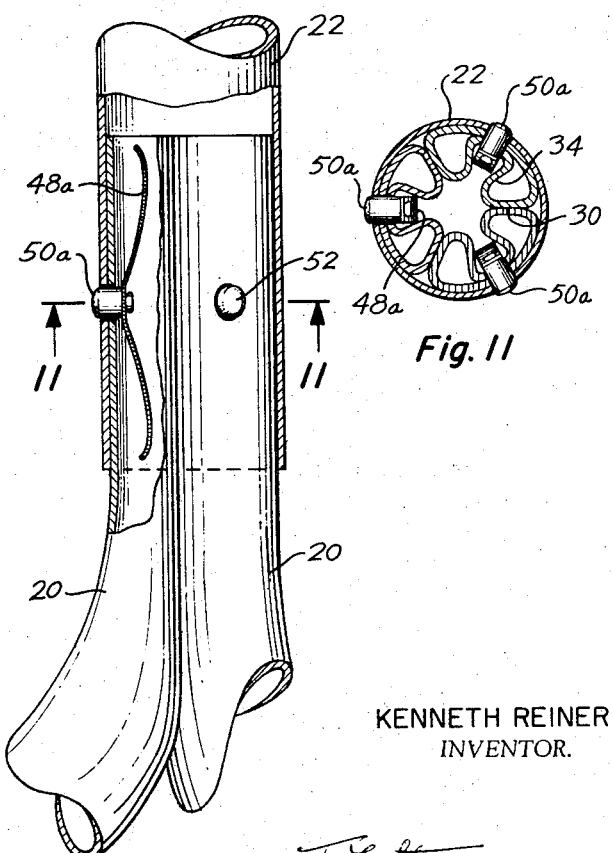

3,563,579

STRUCTURAL JOINTS

This invention relates to structural joints, and more particularly to joints used to connect a plurality of elements to a single element. Typically, such joints may be joints for stand structures, wherein a plurality of leg elements are used to support standards or posts to provide tables, trays, coat trees and the like.

In the prior art, joints of the class described have generally been formed by positioning the ends of the leg elements either externally or internally of the standard post, which is usually tubular, or has a tubular end portion, and by connection of the leg elements to the standard, using nut and bolt fasteners or the like. Such constructions are bulky and relatively unsightly in appearance since an external arrangement of legs relative to the post or standard makes a joint having four exposed terminal ends and an internal arrangement requires a relatively large standard or post member to contain the legs. Moreover, such structures are slow and difficult to assemble and disassemble. These disadvantages are important, since such devices are usually shipped to the ultimate user in unassembled form in order to save shipping space, and the assembly or disassembly of the devices is generally an aggravating and time-consuming problem, requiring tools for connecting or disconnecting a plurality of elements.

The present invention provides structures which overcome the inherent disadvantages of the prior art and provide joints which have no exposed element ends and which do not require enlarged post or standard members so that they are not bulky in appearance. Moreover, they are simple to assemble and disassemble since no fastener is required, although one may be used if desired, as will be described hereinafter. When a fastener is used it may be a thumbscrew requiring no tools, or an ordinary slotted head screw threaded fastener. The improved results of the present invention are accomplished by novel joint structures in which the ends of the leg elements have reduced cross sections so that the composite cross section of all of the leg elements, when assembled together, form a shape which may be fitted inside the internal configuration of the tubular standard or post element so that the legs may be inserted into the end of the standard or post member (individually or together) to form a relatively streamlined joint which is structurally sound and which is quite easily and quickly assembled or disassembled. In such a joint, the degree of insertion may be limited by the curve of the leg elements, by size increase, or by other suitable means. If desired, no fastening means whatever may be applied, since the weight of the standard and of the tray or the like supported thereby, along with the juxtaposition of the legs themselves, will maintain the structure in assembled form in normal use.

It is, therefore, an object of the present invention to provide an improved structural joint.

A further object of the present invention is to provide an improved structural joint of the type wherein a plurality of elements are formed into a joint with a single element.

Still another object of the present invention is to provide an improved structural joint of the type in which a plurality of leg elements are connected to a post or standard member, characterized in that the ends of the leg elements are of reduced cross sections and inserted into the end of the post or standard member whereby the resulting joint is of reduced bulk and improved appearance.

Yet another object of the present invention is to provide improved structural joints of the class described, which have the quality of reducing the amount of time and effort required for assembly and disassembly.

These and other objects and the advantages attendant thereto will become evident from the following detailed specification, taken in conjunction with the attached drawings, wherein like reference numerals have been appended to like parts throughout and wherein:

FIG. 1 is a perspective view of a stand, in which the joint between the legs and the post are generally illustrative of joints according to one preferred embodiment of the present invention, some parts of the stand being shown in dotted lines.

FIG. 2 is a fragmentary elevation view, to enlarged scale, of the leg-post joint of the stand shown in FIG. 1, with a portion of the post member broken away for clarity of illustration.

FIG. 3 is a cross section, taken along the line 3–3 of FIG. 2.

FIG. 4 is a fragmentary elevation, similar to FIG. 2, in slightly reduced scale, illustrating another preferred embodiment of the present invention, with several of the leg elements shown in dotted lines for clarity of illustration.

FIG. 5 is a cross section, taken along the line 5–5 of FIG. 4.

FIG. 6 is a view similar to FIG. 4, illustrating still another preferred embodiment of the present invention.

FIG. 7 is a cross section, taken along the line 7–7 of FIG. 6.

FIG. 8 is a view similar to FIG. 4, illustrating yet another preferred embodiment of the present invention.

FIG. 9 is a view similar to FIG. 4, illustrating another preferred embodiment of the present invention.

FIG. 10 is a view similar to FIG. 4, illustrating another embodiment of the present invention.

FIG. 11 is a cross section, taken along the line 11–11 of FIG. 10.

Reference is now made to FIGS. 1, 2 and 3 illustrating a preferred embodiment of the present invention. FIG. 1, shows the joint of the present invention as applied to a stand structure comprised of leg elements 20 and a post element 22 to the end of which a table 24 may be attached, as by a collar 26 and which may also be provided, if desirable, with auxiliary table elements such as indicated in dotted lines, at 28. The details of the joint are more specifically shown in FIGS. 2 and 3 and the joint is formed by insertion of the terminal end portion of the leg elements 20 into the open end of the tubular end portion of the post element 22. As may be seen from inspection of FIGS. 2 and 3, the inserted terminal ends of leg elements 20 are of reduced cross section such that the composite cross section of all of said inserted terminal ends is such as to fit the internal cross section of the post element solidly and tightly, The length of axial insertion may be limited by various means as will be discussed, including either the abutment of the curved portion of the leg elements 20 with the edge of the post opening or by interference from an increased cross section of the uninserted portion of the leg elements and both expedients are shown in the drawings. It should be understood from the foregoing that, in its broadest sense, the present invention may be practiced by using either solid or tubular leg elements since only the external configuration thereof is important; that the specific shapes of the inserted terminal ends of the leg elements can be identical or may vary since it is necessary for the practice of this invention only that the total configuration when they are assembled together should conform closely to that of the internal cross section of the tubular end portion of the post element; and that the internal configuration of the tubular end portion and the external configuration of the terminal ends of the leg elements when assembled within the tubular end portion may be any desired configuration, either circular or noncircular, it being required only that they match one another.

The specific joint chosen for purposes of illustration is of a tubular post of circular internal and external configuration and tubular leg elements having identical ends of reduced cross section. There are three leg elements, as shown, and their cross sections at their terminal ends have been identically reduced so that each has an outer wall portion 32 in the form of an arc of a circle having a radius slightly smaller than that of the internal circular form of the post 22 and side portions 30 which extend radially inwardly of the arcuate wall section 32. While the remaining material of the inserted ends could be cut away, they may, if desired, be formed inwardly of the arcuate sector, as shown at 34, to provide added rigidity. As may be seen from inspection of FIG. 3, each inserted terminal end of a leg element portion is of a size to provide about 120° of a circular sector so that when the three leg elements are assembled they form a composite body having an external form of a configuration to fit tightly within the tubular end of post element 20. The degree of insertion may be limited by the longitudinal configuration of the leg elements, as by the outward bend of such leg elements or by the abutment of the enlarged uninserted portions of the leg elements with the edge of the post element 20 as may be seen by inspection of the drawings. With such insertion, a sturdy joint is formed, as seen in the embodiment of FIGS. 1, 2 and 3, such a wedging action provides an extremely tight engagement with the tubular member.

From the above it may be seen that a novel structural joint of the type under discussion has been provided which is easy to assemble or disassemble without tools, and the finished form of which effects a savings in materials and effort, and in which the appearance is an improvement over prior known similar structural joints by virtue of the fact that the leg elements simply converge into the post element in a streamlined manner, there being no requirement for unsightly external connections or for the equally unsightly and uneconomical provision of an enlarged post element for receiving the inner ends of full-sized leg elements. With the arrangement of the present invention the uninserted portions of the leg elements may be of a configuration substantially as large as that of the post element and this has not been previously Thus this invention provides wide latitude in selection of sizes which will provide structures of attractive appearance.

Structural joints according to the present invention may be provided with various means other than those already described for limiting the length of axial insertion of the end portions of the leg elements; with fastening means to tightly fasten the composite inserted leg portion assembly into the end of the tubular post section; and with additional means for resisting rotation of the leg assembly relative to the post element, if such means are considered desirable, or necessary. Such variations are shown in FIGS. 4 to 11 of the drawings.

FIGS. 4 and 5 illustrate another preferred embodiment in which different means for defining the insertion position of the leg assembly is illustrated and wherein means is provided for tightening the inserted leg assembly against the internal surface of the post element. In this construction a plug element 36 is fitted internally of the tubular post element at a predetermined distance to serve as the means for limiting insertion of the terminal ends of leg elements 20 to a desired amount. The plug element may be provided with a projection 37 of a size and shape to tightly fit within the space between the leg element segments to steady and tighten the joint still further. Added means for preventing relative rotational and longitudinal movement may be provided by an aperture 38 in at least one of the leg elements in the inserted portion thereof, at a given distance from the end thereof, and of at least one matching opening in the tubular post element at an equivalent distance from the plug 36. Either the aperture 38 or the said matching opening is screw threaded, whereby, after assembly of the leg elements 20 within the open end of the tubular post portion, and rotation of the leg assembly to a position wherein the apertures in a leg element and in the post element are matching, a thumbscrew or slotted-head screw may be inserted into the aligned aperture and opening and tightened to the position shown in FIG. 5, wherein the inner end thereof engages the edges of the other two inserted leg ends to force said last mentioned two leg ends outwardly into contact with the inner surface of the post element 22 and, in reaction, to also force the screw bearing leg end outwardly, thus forming a tight joint in which relative rotation and longitudinal movement of the parts is inhibited. It should be noted, in the FIGS. 4 and 5 modification that either plug 36 or thumbscrew 40 may serve as the means to limit insertion of the leg elements to the desired amount. The use of plug 36 in this embodiment serves only as an aid to positioning the inserted terminal ends of the leg elements so that the apertures align properly for insertion of thumbscrew 40.

FIGS. 6 and 7 illustrate still another preferred embodiment utilizing yet another means for limiting the degree of insertion of the leg element ends. Thus, three slots 42 are provided, as shown, equally angularly spaced from one another at the end of the tubular post member 20. Two of the leg elements are provided with radially extending detents containing outwardly extending flanges, as at 44, at a desired distance from the ends thereof and the third leg with a thumbscrew 40 at the same distance from its end, as shown in the drawings. This joint is assembled by inserting a leg with a detent or the leg with the thumbscrew in turn in each of the slots 42. The thumbscrew is then tightened to cause the inserted assembly to wedge itself firmly against the inner wall of tubular post 22 to inhibit longitudinal separation and relative rotation of the parts. The detents 44 may take the form of a rivet anchored in the leg elements or may be formed integrally of the material of the leg elements to provide suitable outwardly extending flanges.

FIG. 8 illustrates another preferred embodiment wherein different means are used for fastening the leg elements into the post element for inhibiting relative movement. In this embodiment, a plug 36 is used to limit the degree of insertion and the plug has a screw-threaded stud 37a of lesser cross section than the projection 37 previously described (FIG. 4) and which extends toward the open end of tubular post 22, as shown at 45. A plug extension 46 which has an internally threaded cavity adapted to engage the threaded stud 37a and an external cross-action adapted to fit in the central space between the inserted ends of the leg assembly. In assembling this joint, the end of the leg elements 20 are inserted into tubular element 22 until they contact the face of plug 36 at which point the tabs 36 extend inwardly around the threaded stud 37a. The plug extension 46 is then inserted and screwed down upon the projection 37a to the position shown in FIG. 8, as by use of a screwdriver in the slot 48. It may readily be seen that the tabs 45 are then firmly engaged between the face of plug 36 and the inner end of plug extension 48 to inhibit relative movement of the parts.

FIG. 9 and FIGS. 10 and 11 illustrate two further embodiments wherein spring pressed tabs are utilized to position and retain the leg elements 22 within the post element 20. In the FIG. 9 embodiment the projection 37b is provided with a bulbous end, as shown, and a spring element 48 is assembled into each of the leg elements. Each leg element terminal end is slotted, as at 49, and each spring element 48 is provided with a projecting lip as at 50, whereby a spring element may be inserted into the end of a leg element and snapped into slot 49 as the lip 50 enters the slot to firmly position the spring element 48. Then as each leg element end is inserted into tubular post 22 the lip 50 is engaged under the bulbous end of projection 37a to inhibit relative movement of the parts, it being notable that the joint is easily disassembled by merely pulling the leg elements sufficiently strongly to overcome the spring force exerted by the springs 48.

FIGS. 10 and 11 illustrate a spring pressed detent arrangement for holding the parts against relative movement. In this construction each leg element terminal end is provided with a spring pressed detent comprising a leaf spring 48a and a detent element 50a riveted substantially medially thereof. Each leg element is provided with an aperture 52 at a distance from the end thereof which is at least slightly longer than the distance of detent 50a from the end of spring 48a. A spring and detent element is assembled into each of the leg elements by simply inserting it into the end of the leg element (with the spring ends bearing on the walls of the inwardly deformed portion 34 thereof, as best shown in FIG. 11) until the detent 50a snaps into the aperture 52. Post element 22 is provided with equiangularly spaced matching apertures at a desired distance from the ends thereof. This structure is assembled by insertion of the terminal end of each leg into the tubular end of the post element until its detent 50a snaps through a matching aperture in the post element, the detents and apertures then serving as means to position the leg assembly relative to the post element and to inhibit relative rotational and longitudinal movement of the parts.

From the above it may be seen that structures have been described which provide novel structural joints of the type wherein a plurality of elements are joined to a single element as in the connection of leg elements to a post or standard or in the connection of hangar elements to a post or standard. The novel structures are characterized in that the ends of the leg elements are of reduced cross section and inserted into the open tubular ends of tubular post elements to provide economical, easily assembled and disassembled, and physically more attractive constructions. Various alternative means have been described for positioning the parts and for inhibiting relative movement thereof.

Structural joints according to the present invention may obviously be made of any suitable materials, it being necessary only that the post or standard be tubular or have a tubular end portion and may be of any desired internal and external configuration, either circular or noncircular. The leg elements may be either solid or of tubular construction shaped to the disclosed shapes or equivalent shapes and various positioning and fastening means other than those shown could be utilized within the teachings of the present disclosure Accordingly, it is to be understood that the scope of the present invention is not intended to be limited by the specific details of the illustrative examples given herein but rather by the scope of the appended claims.

I claim:

1. A structural joint comprising a first element and a plurality of other elements adapted to be connected therewith, said first element having a tubular end portion, said plurality of other elements having terminal ends of lesser cross section than the remainder of said other elements, said terminal ends being engaged within said tubular end portion, said terminal ends having a composite cross section with peripheral surfaces in engagement with the internal surface of said tubular end portion, means to inhibit relative movement of the said terminal ends relative to said tubular end portion, said means comprising a plug positioned internally of the tubular end portion, the degree of insertion of said terminal ends into said tubular end portion being limited by abutment of said terminal ends with said plug, the composite cross section of said terminal ends including a central through passage, said plug having a projection extending toward the open end of said tubular end portion and tightly fitting into the abutting end of said passage.

2. A structural joint comprising a first element and a plurality of other elements adapted to be connected therewith, said first element having a tubular end portion, said plurality of other elements having terminal ends engaged within said tubular end portion, said terminal ends having a composite cross section with peripheral surfaces in engagement with the internal surface of said tubular end portion, and means to inhibit relative movement of the said terminal ends relative to said tubular end portion, said means comprising a plug positioned internally of the tubular end portion, the degree of insertion of said terminal ends into said tubular end portion being limited by abutment of said terminal ends with said plug, the composite cross section of said terminal ends including a central through passage, said plug having a projection extending toward the open end of said tubular end portion and tightly fitting into the abutting end of said passage, said projection comprising a relatively thin externally threaded extension and a stud member having an internally threaded end cavity threaded on said extension, the inner edge of each of said terminal ends having a radially inwardly directed tab tightly engaged between the face of the plug and the inner end of the stud member.

3. A structural joint comprising a first element and a plurality of other elements adapted to be connected therewith, said first element having a tubular end portion, said plurality of other elements having terminal ends engaged within said tubular end portion, said terminal ends having a composite cross section with peripheral surfaces in engagement with the internal surface of said tubular end portion, and means to inhibit relative movement of the said terminal ends relative to said tubular end portion, said means comprising a plug positioned internally of the tubular end portion, the degree of insertion of said terminal ends into said tubular end portion being limited by abutment of said terminal ends with said plug, the composite cross section of said terminal ends including a central through passage, said plug element having a projection extending toward the open end of said tubular end portion, said projection terminating in an enlarged ball to provide a shoulder, each of said terminal ends having an inwardly extending spring finger engaging under said shoulder whereby longitudinal removal of said terminal ends from the tubular end portion is inhibited.

4. A structural joint comprising a first element and a plurality of other elements adapted to be connected therewith, said first element having a tubular end portion, said plurality of other elements having terminal ends engaged within said tubular end portion, said terminal ends engaged within said tubular end portion, said terminal ends having a composite cross section with peripheral wall surfaces in engagement with the internal surface of said tubular end portion, said tubular end portion having slots opening into the end thereof, each of said terminal ends having a radially outwardly extending detent on the outer peripheral wall surface thereof at a distance from the inner edge thereof, said detents being positioned in said slots, whereby the degree of insertion of said terminal ends into said tubular end portion is limited and relative rotational movement of the parts is inhibited.

5. A structural joint according to claim 4 wherein at least some of said detents have enlarged head portions, said enlarged head portions engaging externally of said slots.

6. A structural joint comprising a first element and a plurality of other elements adapted to be connected therewith, said first element having a tubular end portion, said plurality of other elements having terminal ends engaged within said tubular end portion, said terminal ends having a composite cross section with peripheral surfaces in engagement with the internal surface of said tubular end portion, said tubular end portion being of circular internal cross section and there being three of said terminal ends; said terminal ends each being of tubular construction and having an external configuration reduced to a substantially 120° partial cylindrical sector having radial sidewalls, and an outer wall in the form of a section of a cylinder of a radius to fit the inner wall of said tubular end portion snugly, each of said terminal ends having additional material internally of said sidewalls and said outer wall to stiffen and strengthen the terminal end.

7. A structural joint comprising a first element and a plurality of other elements adapted to be connected therewith, said first element having a tubular end portion, said plurality of other elements having terminal ends engaged within said tubular end portion, said terminal ends having a composite cross section with peripheral surfaces in engagement with the internal surface of said tubular end portion, said tubular end portion being of circular internal cross section and there being three of said terminal ends; said terminal ends each being of tubular construction and having an external configuration reduced to a substantially 120° partial cylindrical sector having radial sidewalls, and an outer wall in the form of a section of a cylinder of a radius to fit the inner wall of said tubular end portion snugly, and means to inhibit relative movement of said terminal ends relative to said tubular end portion, said means comprising a plug positioned internally of the tubular end portion, the composite cross section of said terminal ends including a central through passage, said plug element having a projection extending toward the open end of said tubular end portion, said projection terminating in an enlarged ball to provide a shoulder, each of said terminal ends having an inwardly extending spring finger engaging under said shoulder whereby longitudinal removal of said terminal ends from the tubular end portion is inhibited.

8. A structural joint comprising a first element and a plurality of other elements adapted to be connected therewith, said first element having a tubular end portion, said plurality of other elements having terminal ends engaged within said tubular end portion, said terminal ends having a composite cross section with peripheral surfaces in engagement with the internal surface of said tubular end portion, said tubular end portion being of circular internal cross section and there being three of said terminal ends; said terminal ends each being of tubular construction and having an external configuration reduced to a substantially 120° partial cylindrical sector having radial sidewalls, and an outer wall in the form of a section of a cylinder of a radius to fit the inner wall of said tubular end portion snugly, and means to inhibit relative movement of said terminal ends relative to said tubular end portion, said means comprising at least one aperture through the wall of said tubular end portion, at least one of said terminal ends having a radially disposed passageway therethrough at a distance from the inserted end thereof, and a threaded male fastener extending through said aperture and said passageway in threaded relationship therewith and engaging the other terminal end portions to press said portions against the inner wall of said tubular end portion.

9. A structural joint comprising a first element and a plurality of other elements adapted to be connected therewith, said first element having a tubular end portion, said plurality of other elements having terminal ends engaged within said tubular end portion, said terminal ends having a composite cross section with peripheral surfaces in engagement with the internal surface of said tubular end portion, said tubular end portion being of circular internal cross section and there being three of said terminal ends; said terminal ends each being of tubular construction and having an external configuration reduced to a substantially 120° partial cylindrical sector having radial sidewalls, and an outer wall in the form of a section of a cylinder of a radius to fit the inner wall of said tubular end portion snugly, said tubular end portion having longitudinal slots in the end thereof, each of said terminal ends having a radially outwardly extending detent on the outer wall thereof at a distance from the inner edge thereof, said detents being positioned in said slots, whereby the degree of insertion of said terminal ends into said tubular end portion is limited and relative rotational movement of the parts is inhibited.

10. A structural joint according to claim 9, wherein said ends are tubular and wherein at least some of said detents have enlarged head portions, said enlarged head portions engaging externally of said slots.

11. A structural joint according to claim 10, wherein one of said detents is a thumbscrew, said thumbscrew having a shank which extends through the terminal end to which it is affixed, said shank extending through said last mentioned terminal end and into engagement with the inner edges of the two other terminal end portions to provide an expansive force urging said terminal end portions into tight engagement with the inner wall of said tubular end portion to inhibit relative movement of the parts.